T. J. McKAY.
FLYTRAP.
APPLICATION FILED AUG. 4, 1920.

1,360,127.

Patented Nov. 23, 1920.

WITNESSES
H. N. Windridge
Geo. L. Beeler

INVENTOR
Thomas J. McKay
BY Munn & Co.
ATTORNEYS

UNITED STATES PATENT OFFICE.

THOMAS J. McKAY, OF ATLANTA, GEORGIA.

FLYTRAP.

1,360,127.  Specification of Letters Patent.  Patented Nov. 23, 1920.

Application filed August 4, 1920. Serial No. 401,202.

*To all whom it may concern:*

Be it known that I, THOMAS J. McKAY, a citizen of the United States, and a resident of Atlanta, in the county of Fulton and State of Georgia, have invented a new and Improved Flytrap, of which the following is a full, clear, and exact description.

This invention relates to fly traps and has particular reference to the provision of a fly trap that is of a most sanitary nature.

Among the objects of the invention therefore is to provide a fly trap having a body or main receptacle of such material as to be easily and thoroughly sterilized and cleansed and from which practically all of the other parts are removable.

Another object of the invention is to provide a fly trap that is so constructed as to provide for the utmost attraction for luring the insects thereto.

A still further object of the invention is to provide a trap in which the bait is held in a position and condition most suitable for attracting the insects, and yet in which it is preserved indefinitely in a clean and sanitary condition.

With the foregoing and other objects in view the invention consists in the arrangement and combinations of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1:
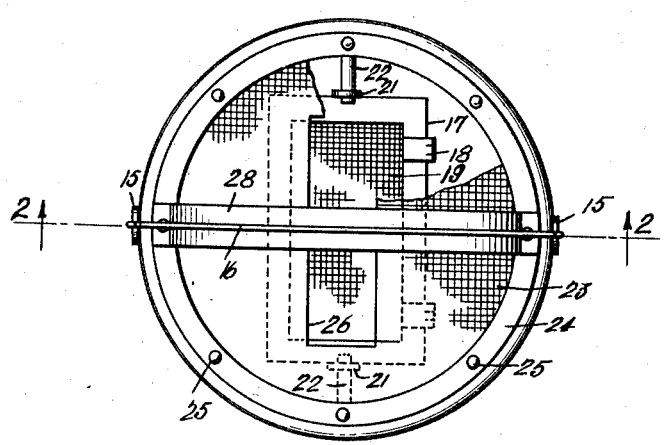
Figure 1 is a plan view of my improvement, parts being broken away.
Figure 2:
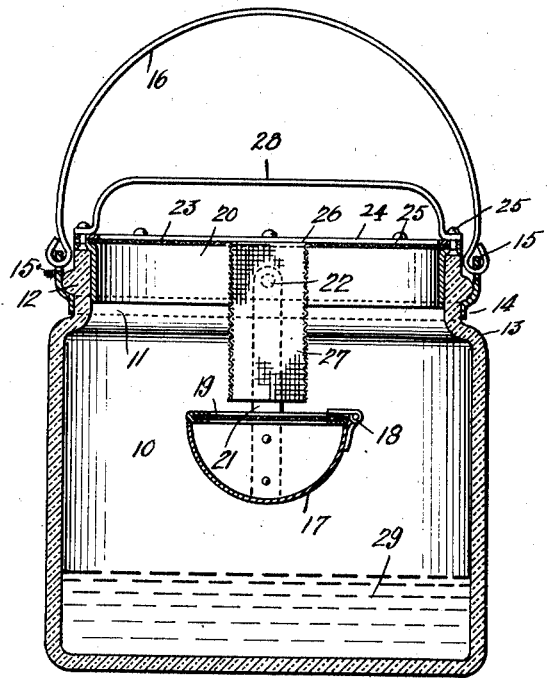
Fig. 2 is a vertical section on the line 2—2 of Fig. 1.

Referring now more specifically to the drawings I show my improved trap as comprising a main receptacle or body 10 of any suitable sanitary material such as glass, porcelain, or the like, preferably of a transparent nature and having at its upper end a neck 11 with a preferably circular open mouth. On the outer surface of the neck is formed a bead 12 and extending therearound forming between the bead and the shoulder portion 13 of the body a seat for a ring 14 of metal or the like connected permanently to the neck portion of the body. Said ring is provided with a pair of upwardly projecting ears 15 in which is pivotally connected a bail 16 by which the entire device may be lifted or otherwise manipulated. The ring and the bail are the only parts of the apparatus permanently connected to the body.

Suspended or otherwise supported in any suitable manner within the body is a bait receptacle 17 shown herein as semi-cylindrical and extending in a horizontal direction across the interior of the body. This bait receptacle may be made of sheet metal or any other stable, durable material, preferably of an imperforate nature. Hinged at 18 at one side of the receptacle 17 is a lid 19 composed principally of an open mesh or reticulated material such as wire gauze. The lid is adapted to lie flat upon the top of the bait receptacle when closed and needs to be swung open only when introducing the bait into the receptacle.

As a preferred means to suspend or support the bait tray I provide a collar 20 of sheet material such as metal and of angular form in cross section, the vertical flange of which being adapted to slip within the neck of the body while the horizontal flange rests upon the upper edge of the neck. The bait tray 17 is provided with hangers 21 fixed to the ends thereof and pivotally connected at 22 to the collar 20 so that the bait tray may be swung laterally with respect to the collar when the lid 19 is to be opened.

The collar 20 constitutes the main part of the cover for the body 10, and connected permanently to the collar is a reticulated member 23 of wire gauze or the like, the connection being made through a ring 24 fastened by means of rivets or the like 25 through the horizontal flange portion of the collar. The central portion of the cover screen 23 is slotted or formed with an oblong opening 26 from which there extends downward a gateway 27 also preferably of wire gauze or other equivalent reticulated material. The open lower end of this gateway 27 is spaced a slight distance say a half inch from the lid 19 of the bait tray. The gateway 27 may be regarded as a permanent part of or integral with the cover screen 23. A rigid handle 28 is attached to the cover as by means of a portion of the rivets 25.

In the practice of this trap the body 10 will be supplied with a suitable quantity of water 29 and any suitable bait adapted to emit an odor attractive to the insects will be placed within the tray 17. The cover with the tray so charged with bait will then be put upon or within the neck of the body 10 and the device in this complete condition will be set or hung wherever desired for the purpose of attracting and trapping insects. Insects such as flies, or the like that may be attracted either by the appearance or the odor of the bait will pass downward through the gateway 27 and will drop or alight upon the lid of the bait tray whence they will fly or otherwise pass laterally into the main portion of the body. In the failure of the insects to reach the bait and to escape from the space within the body they will fall into the water 29 and drown. I wish to emphasize therefore at this time that the body of water may receive and collect a large number of insects before requiring to be renewed, but when such renewal of the water is necessary the same may be effected by simply lifting off the cover, carrying with it the bait tray, dumping out the filthy charge of water and presenting the body 10 in a perfectly clean and sanitary condition with a fresh supply of water therein. The bait may thus be preserved indefinitely without deterioration, at least as long as the odor thereof is effective.

I claim:

1. The herein described insect trap comprising a vitreous receptacle for holding a quantity of water, a cover for the receptacle having a reticulated screen, said screen having a central opening through which the insects may pass into the receptacle, a bait tray within the receptacle, means to hold the bait tray in spaced relation below the cover, and means to prevent the insects from reaching the bait.

2. The herein described insect trap comprising a receptacle having an open mouth, a cover supported upon said open mouth and including a reticulated member formed with an opening therein through which insects may pass downward into the receptacle, a bait tray and means to suspend the bait tray from the cover and within the receptacle directly beneath said opening.

3. A device as set forth in claim 2 in which the bait tray includes a hinged lid of reticulated material whereby odor is emitted from the tray when the lid is closed.

4. A device as set forth in claim 2 in which there is provided a tubular gateway leading downward from the cover opening toward the bait tray.

5. A device as set forth in claim 4 in which the tubular gateway is of an open mesh material.

6. A device as set forth in claim 4 in which the means for suspending the bait tray has pivotal connection to the cover whereby the bait tray may be swung to one side of the gateway to afford access to the interior of the bait tray.

THOMAS J. McKAY.